United States Patent
Kaluskar et al.

(10) Patent No.: US 7,747,754 B2
(45) Date of Patent: Jun. 29, 2010

(54) TRANSPARENT MIGRATION OF STATELESS SESSIONS ACROSS SERVERS

(75) Inventors: Sanjay Kaluskar, Menlo Park, CA (US); Sreenivas Gollapudi, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1080 days.

(21) Appl. No.: 10/917,882

(22) Filed: Aug. 12, 2004

(65) Prior Publication Data

US 2005/0038828 A1    Feb. 17, 2005

Related U.S. Application Data

(60) Provisional application No. 60/495,368, filed on Aug. 14, 2003.

(51) Int. Cl.
G06F 15/16 (2006.01)
(52) U.S. Cl. .................................. 709/227; 709/228
(58) Field of Classification Search ............... None
See application file for complete search history.

(56) References Cited

U.S. PATENT DOCUMENTS

| | | | |
|---|---|---|---|
| 5,013,222 A | | 5/1991 | Sokol et al. |
| 5,758,345 A | | 5/1998 | Wang |
| 5,774,668 A | * | 6/1998 | Choquier et al. ............ 709/223 |
| 5,890,167 A | | 3/1999 | Bridge, Jr. et al. |
| 5,918,059 A | | 6/1999 | Tavallaei et al. |
| 5,951,694 A | * | 9/1999 | Choquier et al. ............ 714/15 |
| 6,041,357 A | * | 3/2000 | Kunzelman et al. ......... 709/228 |
| 6,088,728 A | | 7/2000 | Bellemore et al. |
| 6,105,067 A | * | 8/2000 | Batra ........................ 709/227 |
| 6,178,529 B1 | | 1/2001 | Short et al. |
| 6,182,139 B1 | * | 1/2001 | Brendel ..................... 709/226 |
| 6,243,751 B1 | | 6/2001 | Chatterjee et al. |
| 6,272,503 B1 | | 8/2001 | Bridge et al. |

(Continued)

FOREIGN PATENT DOCUMENTS

EP    0 942 363 A2    9/1999

(Continued)

OTHER PUBLICATIONS

International Searching Authority, "Notification of Transmittal of the International Search Report and the Written Opinion of the International Searching Authority, or the Declaration," PCT/US2004/026405, dated Jan. 6, 2006, 13 pages.

(Continued)

*Primary Examiner*—Salad Abdullahi
*Assistant Examiner*—Clayton R Williams
(74) *Attorney, Agent, or Firm*—Hickman Palermo Truong & Becker LLP; Deborah L. Caswell (57) ABSTRACT

Techniques allow a client to be migrated from a session that has been established for a client on a server to another session on another server in a way that is transparent to the application for which the initial session was established. The sessions are migrated under conditions in which a copy of session state of the session to migrate from the source node does not have to be captured and restored to a destination session.

21 Claims, 6 Drawing Sheets

U.S. PATENT DOCUMENTS

| | | | |
|---|---|---|---|
| 6,327,622 B1 | 12/2001 | Jindal et al. | |
| 6,347,313 B1 | 2/2002 | Ma et al. | |
| 6,556,659 B1 | 4/2003 | Bowman-Amuah | |
| 6,587,866 B1* | 7/2003 | Modi et al. | 718/105 |
| 6,601,101 B1* | 7/2003 | Lee et al. | 709/227 |
| 6,667,751 B1 | 12/2003 | Wynn et al. | |
| 6,728,748 B1 | 4/2004 | Mangipudi et al. | |
| 6,816,907 B1 | 11/2004 | Mei et al. | |
| 6,925,477 B1 | 8/2005 | Champagne et al. | |
| 7,024,394 B1 | 4/2006 | Ashour et al. | |
| 7,058,957 B1 | 6/2006 | Nguyen | |
| 7,107,294 B2 | 9/2006 | Romanufa et al. | |
| 7,174,379 B2 | 2/2007 | Agarwal et al. | |
| 7,178,050 B2 | 2/2007 | Fung et al. | |
| 7,263,590 B1 | 8/2007 | Todd et al. | |
| 7,269,157 B2 | 9/2007 | Klinker et al. | |
| 7,277,945 B1 | 10/2007 | Shah et al. | |
| 2001/0056493 A1 | 12/2001 | Mineo | |
| 2002/0073139 A1 | 6/2002 | Hawkins et al. | |
| 2002/0129157 A1 | 9/2002 | Varsano | |
| 2002/0161896 A1 | 10/2002 | Wen et al. | |
| 2002/0194015 A1 | 12/2002 | Gordon et al. | |
| 2003/0005028 A1 | 1/2003 | Dritschler et al. | |
| 2003/0007497 A1 | 1/2003 | March et al. | |
| 2003/0063122 A1 | 4/2003 | Cichowlas et al. | |
| 2003/0088671 A1 | 5/2003 | Klinker et al. | |
| 2003/0108052 A1 | 6/2003 | Inoue et al. | |
| 2003/0135642 A1 | 7/2003 | Benedetto et al. | |
| 2003/0208523 A1 | 11/2003 | Gopalan et al. | |
| 2003/0217159 A1 | 11/2003 | Schramm-Apple et al. | |
| 2004/0003041 A1* | 1/2004 | Moore et al. | 709/204 |
| 2004/0078602 A1 | 4/2004 | Rothbarth et al. | |
| 2004/0111506 A1 | 6/2004 | Kundu et al. | |
| 2004/0117794 A1 | 6/2004 | Kundu | |
| 2004/0176996 A1 | 9/2004 | Powers et al. | |
| 2004/0268357 A1 | 12/2004 | Joy et al. | |
| 2005/0021771 A1 | 1/2005 | Kaehn et al. | |
| 2005/0050116 A1 | 3/2005 | Gross et al. | |
| 2005/0132222 A1 | 6/2005 | Petrovic | |
| 2005/0165925 A1 | 7/2005 | Dan et al. | |
| 2005/0239476 A1 | 10/2005 | Betrabet et al. | |
| 2005/0267965 A1 | 12/2005 | Heller | |
| 2006/0036617 A1 | 2/2006 | Bastawala et al. | |
| 2007/0226323 A1 | 9/2007 | Halpern | |
| 2009/0100180 A1 | 4/2009 | Chidambaran et al. | |

FOREIGN PATENT DOCUMENTS

| | | |
|---|---|---|
| EP | 0942363 | 9/1999 |
| EP | 0 992 909 A2 | 4/2000 |
| EP | 1 170 662 A2 | 1/2002 |
| WO | WO 02/00737 | 1/2002 |
| WO | WO 02/05116 A2 | 1/2002 |
| WO | WO 02/07037 | 1/2002 |
| WO | WO 02/07037 A | 1/2002 |
| WO | WO 02/097676 A2 | 12/2002 |
| WO | WO 03/014928 | 2/2003 |
| WO | WO 03/014928 A2 | 2/2003 |
| WO | WO 03/014929 A1 | 2/2003 |
| WO | WO 03/062983 | 7/2003 |
| WO | WO 03/062983 A2 | 7/2003 |

OTHER PUBLICATIONS

Current Claims, PCT/US2004/026405, 7 pages.

European Patent Office, "Communication Pursuant to Article 96(2) EPC," App. No. 04781256.3 (50277-2985), dated Feb. 2, 2007, 4 pages.

Claims, App. No. 04781256.3 (50277-2985), pp. 34-36.

Kokku, Ravi et al., "Half-Pipe Anchoring: An Efficient Technique for Multiple Connection Handoff," Proceedings of the 10th International Conference of Network Protocols, Nov. 12, 2002, 10 pages.

International Searching Authority, "Notification of Transmittal of the International Preliminary Report on Patentability," PCT/US2004/026445, dated Dec. 12, 2005, 6 pages.

Claims as Amended, PCT/US2004/026445, Aug. 11, 2005, 4 pages (attached).

International Preliminary Examining Authority, "Written Opinion of the International Preliminary Examining Authority," Jun. 7, 2005, 4 pages.

Current Claims of International Application No. PCT/US04/26570, 4 pages.

"Office Action" received in related case U.S. Appl. No. 10/917,661, filed Aug. 12, 2004, 9 pages.

"Office Action" received in related case U.S. Appl. No. 10/918,056, filed Aug. 12, 2004, 9 pages.

"Office Action" received in related case U.S. Appl. No. 10/917,687, filed Aug. 12, 2004, 9 pages.

"Office Action" received in U.S. Appl. No. 11/057,043 dated Apr. 9, 2008, 19 pages.

European Patent Office, "Communication under Rule 71(3) EPC", Application No. 04781286.2-1244, dated Sep. 11, 2008, 6 pages.

Claims, Application No. 04781286.2-1244, dated Sep. 11, 2008, 40 pages.

"Webopedia Definition and Links" 1996 definition of "server" available at: http://web.archive.org/web/20010411032957/http://www.webopedia.com/TERM/s/server.html (3 pages).

"TechWeb Network" 2003 definition of "client" available at: http://www.techweb.com/encyclopedia/printView?term=client&view=print (5 pages).

Jeffrey S. Chase et al., "Dynamic Virtual Clusters In A Grid Site Manager", Jun. 22, 2003, 11 pages.

International Searching Authority, "Notification of Transmittal of the International Search Report and the Written Opinion of the International Searching Authority, or the Declaration," Aug. 4, 2005, 13 pages.

Current Claims for International Application No. PCT/US2004/026389, pp. 1-7.

Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.

European Patent Office, "International Preliminary Report on Patentability," Aug. 26, 2005, International Application No. PCT/US2004/026570, 9 pages.

International Searching Authority, "Notification of Transmittal of the International Search Report and the Written Opinion of the International Searching Authority, or the Declaration," Aug. 25, 2005, 12 pages.

Current Claims for International Application No. PCT/US2004/026445, pp. 1-5.

Henry Song, et al., "Browser State Repository Service," Lecture Notes in Computer Science, vol. 2414, 2002, pp. 1-14, XP002904339.

Eric Skow, et al., "A Security Architecture for Application Session Handoff," 2002, IEEE International Conference Proceedings, Apr. 28,-May 2, 2002, vol. 1 of 5, pp. 2058-2063, XP010589848.

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

International Searching Authority, "Notification of Transmittal of the International Search Report and the Written Opinion of the International Searching Authority, or the Declaration," Nov. 12, 2004, 13 pages.

Current Claims of International Application No. PCT/US2004/026570, 4 pages.

Current Claims of International Application No. PCT/US2004/025805, 8 pages.

International Searching Authority, "Notification of Transmittal of the International Search Report and the Written Opinion of the International Searching Authority, or the Declaration," dated Dec. 3, 2004, 12 pages.

International Searching Authority, "Notification of Transmittal of the International Search Report and the Written Opinion of the International Searching Authority, or the Declaration," PCT/US2004/026405, dated Jan. 6, 2006, 13 pages.

* cited by examiner

TRANSPARENT MIGRATION OF STATELESS SESSIONS ACROSS SERVERS

RELATED APPLICATIONS

The present application claims priority to U.S. Provisional Application No. 60/495,368, Computer Resource Provisioning, filed on Aug. 14, 2003, which is incorporated herein by reference.

The present application is related to the following U.S. applications:

U.S. application Ser. No. 10/917,953, now U.S. Pat. No. 7,552,218, Transparent Session Migration Across Servers, filed by Sanjay Kaluskar, et al. on Aug. 12, 2004 and incorporated herein by reference;

U.S. application Ser. No. 10/917,873, now U.S. Pat. 7,516,221, Hierarchical Management of the Dynamic Allocation of Resources in a Multi-Node System, filed by Benny Souder, et al. on Aug. 12, 2004, and incorporated herein by reference; and U.S. application Ser. No. 10/918,055, now U.S. Pat. 7,552,171, Incremental Run-Time Session Balancing in a Multi-Node System, filed by Lakshminarayanan Chidambaran, et al. on Aug. 12, 2004 and incorporated herein by reference.

FIELD OF THE INVENTION

The present invention relates to managing work load, and in particular, work load management within a multi-node computer system.

BACKGROUND OF THE INVENTION

Many enterprise data processing systems rely on multi-node database servers to store and manage data. Such enterprise data processing systems typically follow a multi-tier model that has a multi-node database server in the first tier, and one or more computers in the middle tier and outer tiers.

Figure 1:
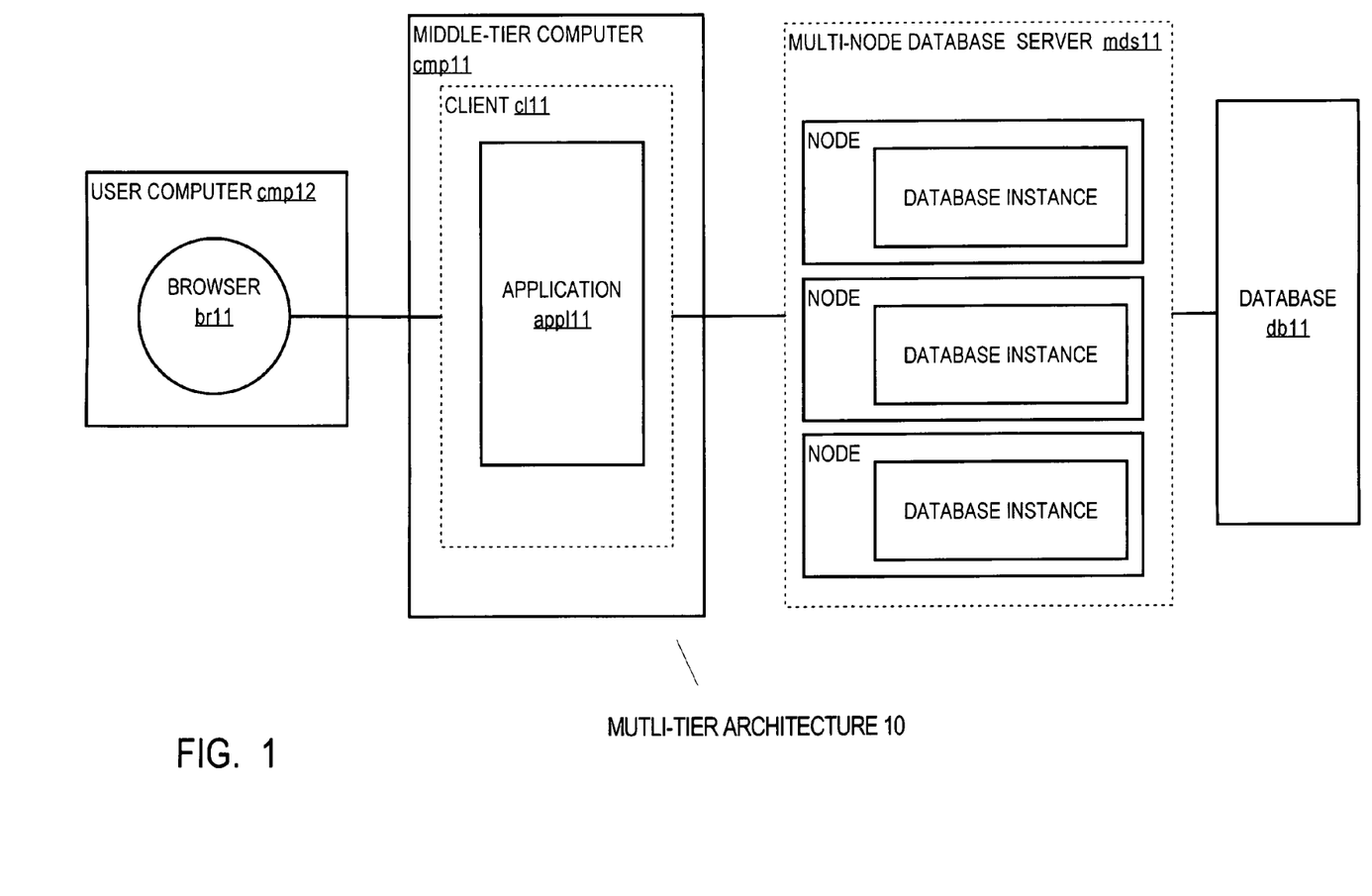
FIG. 1 is a block diagram of a multi-tier architecture for a computer system.

FIG. 1 depicts multi-node database server mds11, which is implemented on multi-tier architecture 10. A server, such as multi-node database server mds11, is a combination of integrated software components and an allocation of computational resources, such as memory, a node, and processes on the node for executing the integrated software components on a processor, the combination of the software and computational resources being dedicated to performing a particular function on behalf of one or more clients. Resources from multiple nodes in a multi-node computer system can be allocated to run a particular server's software. A particular combination of the software on a node and the allocation of the resources from the node is a server that is referred to herein as a server instance or instance. Thus, a multi-node server comprises multiple server instances that can run on multiple nodes. Several instances of a multi-node server can even run on the same node.

A database server governs and facilitates access to a particular database, processing requests by clients to access the database. A multi-node database server, such as multi-node database server mds11, comprises multiple "database instances", each database instance running on a node. Multi-node database server mds11 governs access to database db11. A multi-node database server can govern and facilitate access to one or more databases.

The middle-tier of multi-tier architecture 10 includes middle-tier computer cmp11 and the outer-tier includes user computer cmp12. User computer cmp12 executes browser br11, which interacts with an end-user. The end-user's interaction with browser br11 causes the browser to transmit requests over a network, such as the Internet, to middle-tier computer cmp11. The request causes a process on middle-tier computer cmp11, client c11, to execute application appl11. Execution of application appl11 by the client c11 causes client c11 to connect to multi-node database server mds11. For example, application appl11 may be an order entry application that is configured to receive order requests from browser br11. Data for the order entry application is stored in db11. To process the requests, execution of application appl11 by client c11 causes client c11 to connect to database db11. Once connected, client c11 issues database statements to retrieve and manipulate data stored in database db11.

The tier that directly connects to a server, relative to other tiers in a multi-tier architecture, is referred to herein as containing the client of the server. Thus, client process c11 is referred to herein as the client of multi-node database server mds11.

An application, as the term is used herein, is a unit of software that is configured to interact with and use the functions of a server. In general, applications are comprised of integrated functions and software modules (e.g. programs comprised of machine executable code or interpretable code, dynamically linked libraries) that perform a set of related functions.

An application, such application appl11, interacts with a multi-node database server mds11 via client-side interface component intcomp11. Execution of application appl11 causes client c11 to execute client-side interface component intcomp11 to interact with multi-node database server mds11. Application appl11 includes invocations of routines (e.g. functions, procedures, object methods, remote procedures) of client-side interface component intcomp11. Applications are typically developed by vendors and development teams different from those that develop servers and interfaces to servers, such as multi-node database server mds11 and client-side component intcomp11.

In order for a client to interact with multi-node database server mds11, a session is established for the client on a database instance of multi-node database server mds11. A session, such as a database session, is a particular connection established for a client to a server, such as a database instance, through which the client issues a series of requests (e.g., requests for execution of database statements).

For each database session established on a database instance, session state is maintained for the session. Session state includes the data stored for a database session for the duration of the database session. Such data includes, for example, the identity of the client for which the session is established, and temporary variable values generated by processes and database components executing software within the database session. A database component is a set of software modules that provide specialized and related functions for a database server, and shall be described later in greater detail. An example of a database component is a Java execution engine.

The beginning and end of a session demarcates a unit of work. Often, the beginning of a database session corresponds to an end-user establishing an interactive session with an application via, for example, a browser, and ends when the end-user logs off. Thus, the beginning and ending of the database session depend on application logic and end-user action, and may not be controlled by a server on which the session is established.

Client-Side Interface Components

Client-side interface components, such as client-side interface component intcomp11, are software components that reside and are executed on the same computer of a client of a server, and that are configured to provide an interface between the client and the server. The client-side interface component intcomp11 is configured for performing the detailed operations needed to interface with multi-node database server mds11. For example, an application appl11 invokes a function of client-side interface component intcomp11 to establish a connection to multi-node database server mds11. The client-side interface component then handles the details of a connection on a particular instance of multi-node database server mds11. To make requests of multi-node database server mds11, such as a request for execution of a query, application appl11 is configured to invoke functions of client-side interface component intcomp11, which then transmits a request for the same to the node and database instance on which the session is established.

Client-side interface component intcomp11 may generate and/or access state that is hidden from other software modules, that is, is not or may not be referenced and accessed by other software modules, and in particular, by application appl11. Such state is referred to as being internal or private to client-side interface component intcomp11.

For example, to create a database session on a multi-node database server mds11, application appl11 invokes a routine of client-side interface component intcomp11. The client-side interface component establishes a database session on a particular database instance within multi-node database server mds11, and stores details about the database session within internal data structures or objects. Such data structures and objects define, for example, the session established for an application, and specify such values as an identity of a session on a database instance, the name of the database instance, and a network address and port number for the connection to the database instance.

Such details of the session are not returned to application appl11, nor may application appl11 access the details. Instead, what is provided to application appl11 is an "external identifier" for the session, such as a value that internal data of client-side interface component intcomp11 maps to the session, or a reference to an object generated by client-side interface component intcomp11 to store some details of the session in private attributes of the object that are inaccessible to application appl11. In this way, application appl11 does not "know" of the specific details of the session that has been established for it; however, application appl11 has the information needed to be able to identify to client-side interface component intcomp11 the particular session that has been established for application appl11.

Distributing Workload

An important capability needed to manage multi-node database servers is to distribute work load between the nodes. Distributing work load is used to improve performance, by optimally balancing workload between nodes. Distributing workload also allows work to be shifted from a node that is being taken off-line for maintenance operations to another node.

To improve performance, work load on a multi-node database server is distributed using connection-time balancing. Under connection-time balancing, work load is distributed at connection-time, when a database session for a client is created. Specifically, when a client requests to establish a database session on a multi-node database server, the session is placed on an instance or node based on work load considerations. For example, a client transmits a request for a session to a multi-node database server. The multi-node database server determines that a node is less busy than other nodes, and establishes a session for the client on that node.

A drawback to connection-time balancing is that it cannot rebalance existing sessions; it only balances sessions when they created. The work load created by existing sessions cannot be shifted and does not abate until a client, on its own accord, reduces or ceases to make requests and/or terminates the sessions. As a result, the timing of work load shifting is subject to events not under the control of a multi-node database server.

Based on the foregoing, it is clearly desirable to provide a way to shift work load of clients of sessions after the sessions have been created.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for migrating sessions between nodes in a distributed environment is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques that allow a client to be switched from a session on a server to another session on another server in a way that is a transparent to the application for which the initial session was established. The term migrate refers to an operation in which a client of an existing session on a server is switched from the existing session to another the session, allowing the existing session to be terminated and the client to use the other session in lieu of the existing session. The existing session is referred to herein as having been migrated. The term "transparent" refers to performing an operation in a way that, with respect to a unit of software, does not require execution of instructions in the unit that are tailored to perform the operation. Thus, under transparent session migration, a client is switched between sessions without executing application instructions tailored to accomplish the migration. Instead, a client-side interface component, through which the application interacts with the server, handles details of migration, modifying the internal state of the client-side interface component to effect the same. Legacy applications do not have to be modified in order to institute techniques described herein.

Under session migration, a client requests a session on a multi-node system, and a session is established for a client on a "source server" running on a node. The client is switched to a "destination session" on a "destination server". The destination session is used by the client in lieu of the session on the source server.

The sessions are migrated under conditions in which a copy of session state of the session to migrate from the source node does not have to be captured and restored to a destination session on the destination server. The client specifies these conditions. In addition, a client can identify to the server that a particular session may be migrated without having to capture the session's state. Migrating sessions in this way allows sessions to be migrated sooner because there is no need to transfer state between servers.

The participants of session migration may include a client on a computer, a source server and a destination server, each located on a different node in a multi-node system. The participants follow a variation of a protocol that allows session migration to occur transparently to an application or other software module for which the session was established.

Transparent session migration is illustrated herein as it could be implemented on a multi-node database server. However, an embodiment of the present invention is not limited to migrating sessions that are hosted on a multi-node database server.

Illustrative Computer System

Figure 2:
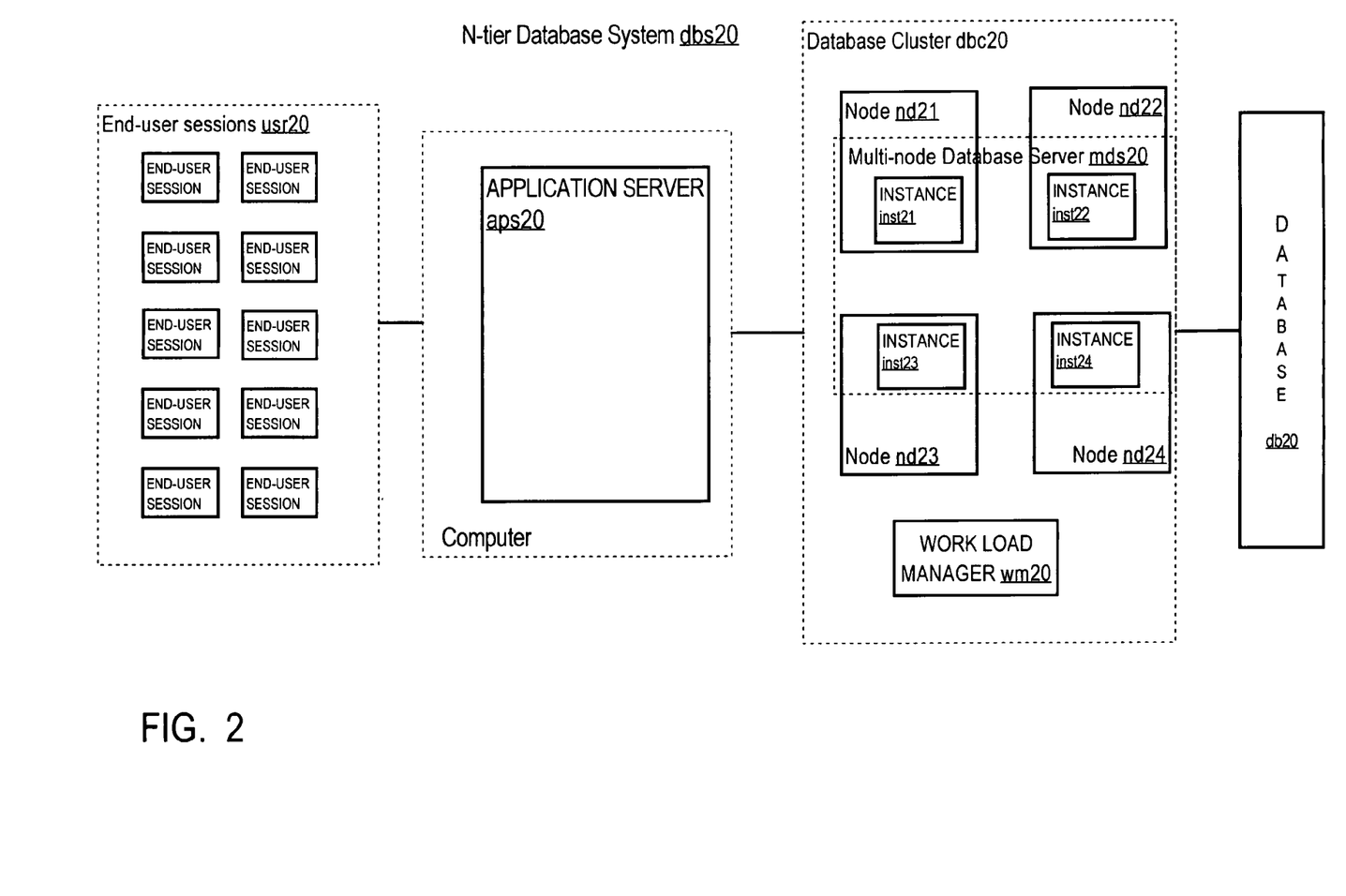
FIG. 2 is a block diagram showing a multi-node computer system on which an embodiment of the present invention may be implemented.

FIG. 2 shows an n-tier database system dbs20, an N-tier computer system used to illustrate an embodiment of the present invention. The first tier includes multi-node database server mds20, which is hosted on database cluster dbc20, the second tier includes application server aps20, which is hosted on a computer, and the outer tier includes end-user sessions usr20, which are sessions on a computer associated with processes connected to application server aps20 over a network connection.

Database cluster dbc20 includes nodes nd21, nd22, nd23, and nd24. The nodes in database cluster dbc20 may be in the form of computers (e.g. work stations, personal computers) interconnected via a network, and may be part of a grid.

Multi-node database server mds20 governs and facilitates access to database dbs20. Multi-node database server mds20 comprises database instances inst21, inst22, inst23, and inst24.

Clients that connect to a database instance that is part of a multi-node database server, directly or through another computer, to access the database managed by the database instance, are referred to herein as clients of the database instance, clients of the multi-node database server, or clients of the database. For example, a process on a computer not part of database cluster dbc20 executes an application and is connected to database instance inst23 to access database db20. The process is referred to as a client of database instance inst23, a client of multi-node database server mds20, and a client of database db20. Similarly, application server aps20 is a client of multi-node distributed database server mds20 and database db20, and any database instance to which application server aps20 is connected.

Work load manager wm20 is a process running on database cluster dbc20 responsible for managing work load on the database instances hosted on database cluster dbc20. Work load manager wm20 may be running on one or more nodes of database cluster dbc20, including nodes nd21, nd22, nd23, and nd24. An example of a work load manager is a database director, described in Incremental Run-Time Session Balancing, which performs run-time session balancing by migrating one or more sessions from a source database instance to a destination database instance.

Application server aps20 is a server that stores, provides access to, and executes application code of an application. Application server aps20 transmits database requests to multi-node database server mds20. The requests may be generated by application server aps20 in response to executing application code stored on the application server. Application server aps20 may include such applications as an order entry application that is configured to transmit database statements to database server mds20 to manipulate tables on database db20 that hold data for the order entry application. An application server may have multiple instances on multiple nodes. An example of an application server is Oracle 9i Application Server or Oracle 10g Application Server.

Application server aps20 may also perform many functions to manage end-user sessions user20 that involve interacting with other types of servers other than a database server. Such servers include a directory server and certificate server.

The processes of end-user sessions usr20 may be executing, for example, browsers connected to application server aps20, via a wide area network or public network, such as the Internet. In response to requests transmitted by the browsers to application server aps20, application server aps20 executes application code, issues database statements to database server mds20, and generates web pages to transmit back to the browser.

Sessions Established for Clients

In order for a client of database server mds20, such as application server aps20, to interact with multi-node database server mds20, a database session is established for the client on a database instance. A client may establish a database session by transmitting a database connection request to database cluster dbc20. A listener receives the database connection request. A listener is a process running on database cluster dbc20 that receives client database connection requests and directs them to a database instance within database cluster dbc20.

Once the database session is established for the client, the client may issue additional requests, which may be in the form of remote procedure invocations, and which include requests to begin execution of a transaction, to execute queries, to perform updates and other types of transaction operations, to commit or otherwise terminate a transaction, and to terminate a database session.

Application server aps20 also establishes application sessions for connections for end-user sessions usr20. Multiple requests from a process of end-user sessions usr20 can be associated with the same application session. An application session may be assigned one or more processes running within application server aps20. Such processes are referred to herein as application session processes.

Illustrative Client and Source and Destination Instance

Figure 3:
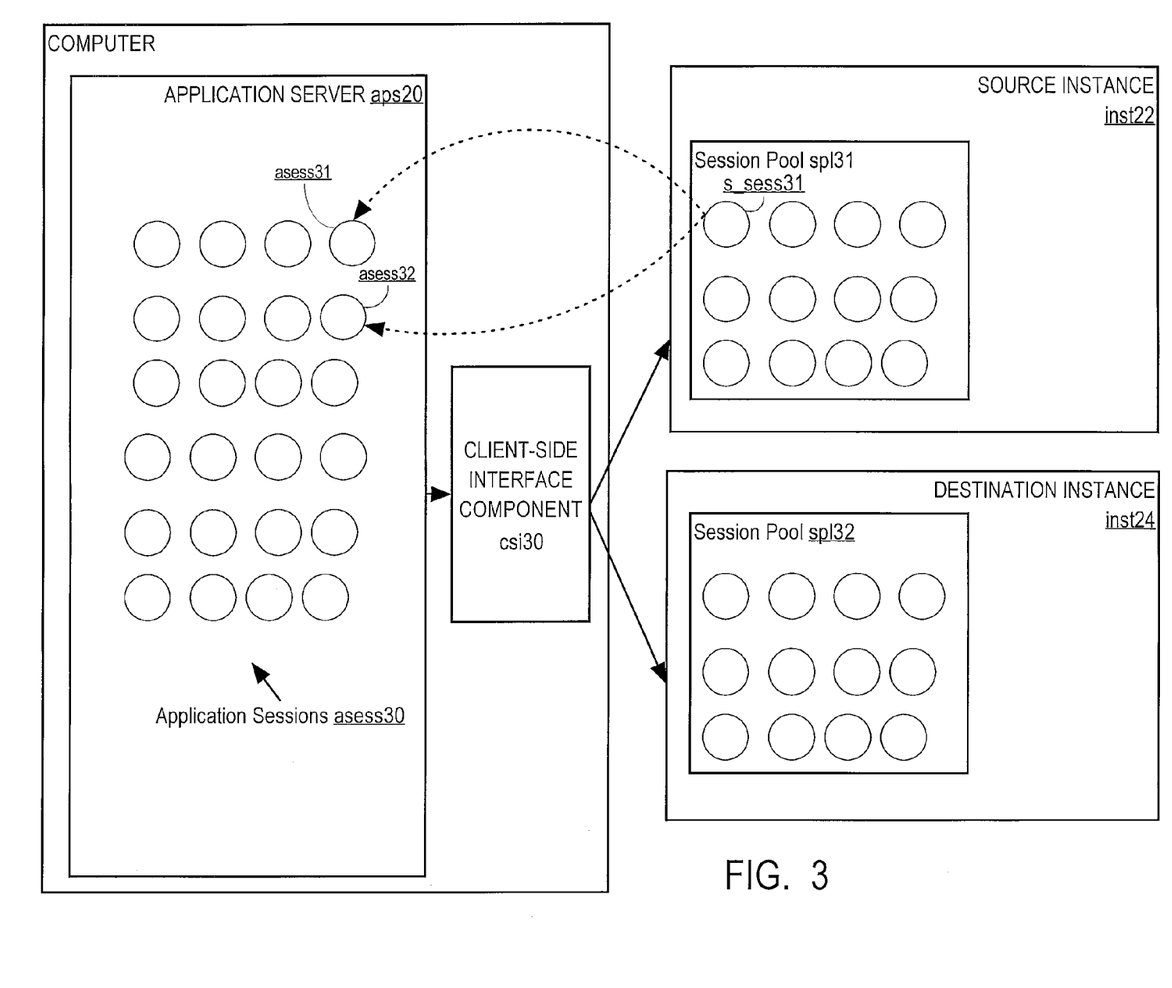
FIG. 3 is a block diagram depicting an application server, source database instance, and destination database instance that participate in migrating a session according to an embodiment of the present invention.

FIG. 3 is a block diagram showing in more detail an application server aps20 and database instances inst22 and inst24 which are used to illustrate transparent session migration according to an embodiment of the present invention. Instance inst22 and inst24 are labeled as source instance inst22 and destination instance inst24, respectively.

Application server aps20 hosts application sessions asess30 and includes client-side interface component csi30. Application server aps20 interacts with multi-node database server mds20 via client-side interface component csi30. Application server aps20 includes invocations of routines (e.g. functions, procedures, object methods, remote procedures) of client-side interface component csi30. Execution of application server aps20 causes application server aps20 to execute client-side interface component csi30 to interact with database cluster dbc20.

For purposes of exposition, software modules, such as application server aps20 and client-side interface component csi30, are described herein as performing particular actions, when in fact execution of the software by a process causes the process to perform those actions. For example, when application server aps20 is described as transmitting or receiving a message or accessing data, a process executing the application software is transmitting or receiving the message or accessing the data.

Session Pooling

Application server aps20 maintains session pool spl31 and spl32 as pools of "pre-established" database sessions on source instance inst22 and destination instance inst24. When a database session for an application session is needed, application server aps20 assigns one from the session pool. The database session is subsequently unassigned from the application session and becomes available for subsequent assignment to another application session. When an application session is assigned and unassigned in this way, the database session is referred to as being checked-out and checked-in, respectively. The period of time between when a database session is checked-out and checked-in is relatively short compared to the lifetime of a database session. A database session can be checked-out numerous times to numerous application sessions.

For example, a user uses a browser associated with an end-user usr20 to order a book. The browser establishes an application session asess31 on application server aps20 to execute an ordering application for ordering a book. The ordering application needs to query database server mds20 to obtain data about books the user is searching for. Application server aps20 checks-out database session s_sess31 from session pool spl31 to the application session. The ordering application issues a query to the database server, the query results are returned to the ordering application, and then database session s_sess31 is checked-in. Next, the ordering application needs to issue a database statement to make database changes to create a book order. Another database session from session pool spl31 is checked-out to application session asess31.

After database session s_sess31 is checked-in, another application session, application session asess32, needs a database session to return a book order. Database session s_sess31 is checked-out to application asess32 so that a database statement needed to make database changes can be issued to database server mds20. Database session s_sess31 is then checked-in and subsequently checked-out numerous other times to numerous other application sessions.

Calls

A call is a request made by a client to a server to execute a task. Typically, a call is made by a process executing an invocation of a routine in a software module. The invocation causes the process to execute the routine (such execution may itself entail calling and executing other routines), and then to return to execute the module to a point at or just beyond the invocation (or some other designated point e.g. exception handler).

A call may entail passing in one or more input parameters to the invoked routine and returning values as one or more output parameters. Messages may be transmitted as part of an input parameter and part of an output parameter. A call to a database instance typically is made to perform a task, such as executing a database statement. A message transmitted by the call may include a query string as an input parameter, and query results or a reference to their location as an output parameter.

A remote procedure call is a call of a routine made by a process in which another process, on the same or different node and/or computer, executes the called routine. The other process is referred to as the remote process. The call is made by transmitting a request to execute a routine to another process over a communication connection, such as a network connection. Also, input parameters and output parameters are transmitted over the connection. While the remote process executes the procedure, the calling process's execution is suspended or blocked.

A call causes the calling process or remote process to execute the called routine, which may cause calling and execution of other routines. The call terminates when the call returns. Operations, which are carried out as part of execution of a called routine, are referred as being made within the call.

For example, to make a call to database cluster dbc20, application server aps20 calls a function of client-side interface component csi30. In response to the invocation, client-side interface component csi30 executes the call, which entails client-side interface component csi30 modifying and accessing "local" data stored in memory by client-side interface component csi30, and client-side interface component csi30 making multiple remote procedure calls to source instance inst22, the multiple remote procedure calls including a first remote procedure call and a second remote procedure call. In response to the first remote procedure call, source instance inst22 performs various operations. The modification and access of the local data, the multiple remote procedure calls, and the various operations performed by source instance inst22, are referred to as being performed within the "application call" made by application server aps20. The various operations performed by source instance inst22 while executing the routine invoked by the first remote procedure call (which may entail execution of other routines) are referred to herein as being made within the first remote procedure call, within a client-side call because the first remote procedure call was made by the client-side interface component csi30, and within an application call because the remote procedure call was made by client-side interface component csi30 while executing a routine called by application server aps20. An application call or client-side call may both be referred to herein as a client call.

Database Components

Figure 4:
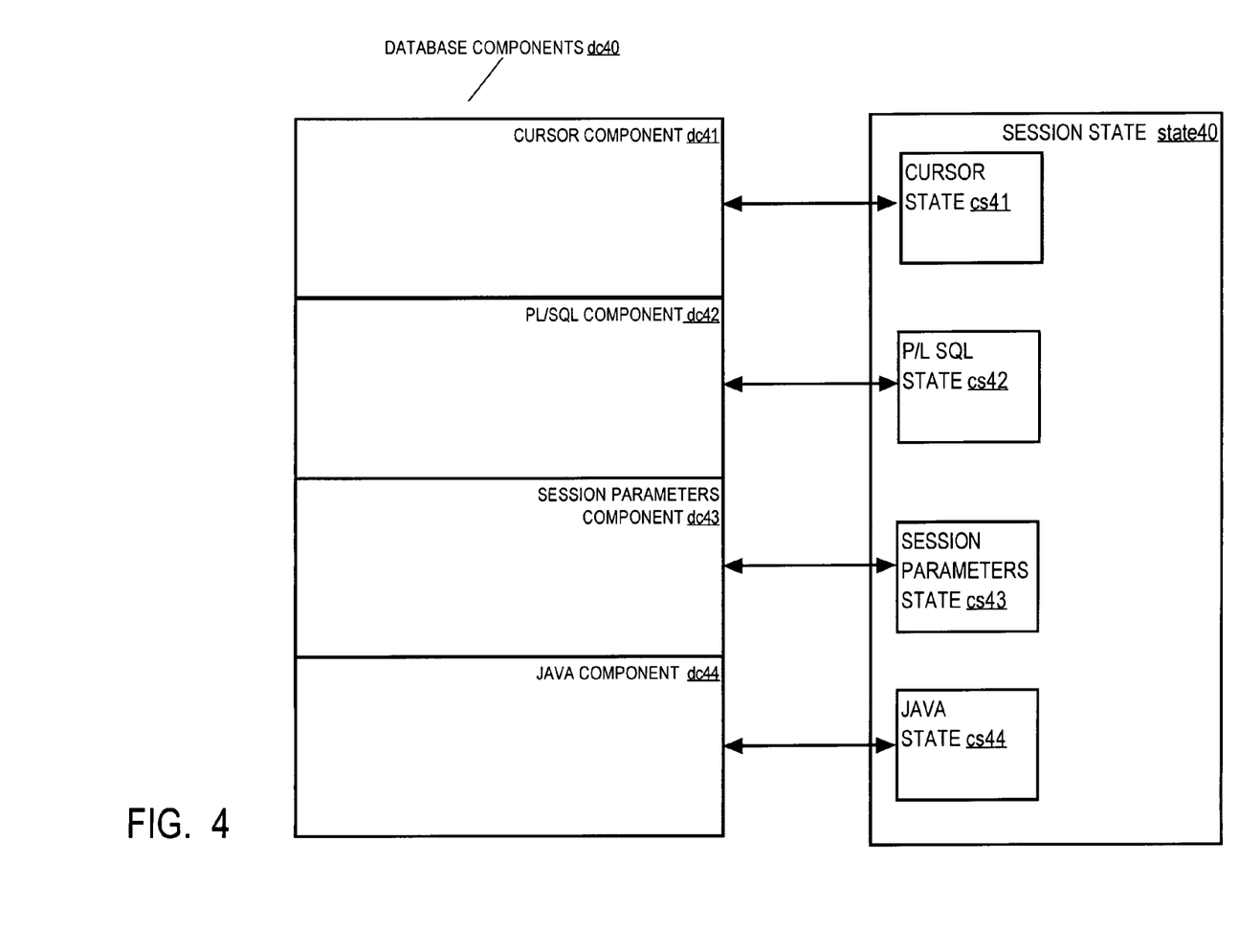
FIG. 4 is a block diagram depicting database components that use a portion of session state of sessions according to an embodiment of the present invention.

A database component is a set of software modules on a database server that provide specialized and related functions. A database component executed during a session may generate and use a portion of the session state, referred to herein as component session state. FIG. 4 depicts an illustrative set of database components and their respective component session states within session state sesst40. Session state sesst40 is the session state for database session s_sess31. FIG. 4 shows the following database components: cursor component dc41, PL/SQL component dc42, session parameter component dc43, and Java component dc44.

Cursor component dc41 is used to manage cursors within a database instance, such as source instance inst22 and destination instance inst24. A cursor is an area of memory used to store information about a parsed database statement and other information related to the processing of the database statement. Cursor component dc41 uses and stores information in cursor state cs41, a component session state within session state sesst40.

PL/SQL component dc42 is responsible for executing code (e.g. procedures) written in PL/SQL, a procedural database language promulgated by Oracle Corporation. The components use component session state PL/SQL state cs42 to store information related to the execution of PL/SQL code, such as variable values and parsed PL/SQL statements.

Session parameters component dc43 is responsible for managing attributes that generally control how calls and requests associated with a session are processed. The attributes are stored in component session state parameters state cs43. For example, session parameters can include an attribute that controls the particular human language for results returned by executing queries.

Java component dc44 is responsible for executing code (e.g. class and object methods) written in Java. The components use component session state Java state cs44 to store information related to the execution of Java code.

Statefull and Stateless Sessions and Session Migration

For a given database session, the database session is stateless when a future application call does not depend on session state generated by prior application calls. The database session is statefull when a future application call depends on session state generated by prior application calls.

Because of the potential dependency of future applications calls upon session state of a statefull session, migration of statefull database sessions entails determining whether portions of session state stored on the source instance may be transferred to another database instance, and if so, transferring copies of the session state between a source database instance and destination instance. A technique for migrating statefull sessions is described in Transparent Session Migration Across Database Servers.

As described therein, various migrations checks are made to determine whether session state may be transferred to another database instance. These migration checks include determining whether a database session is at a transaction boundary, is at a call boundary, or is at a component boundary.

A database session is at a transaction boundary if there are currently no active transactions being executed for the session. A transaction is a logical unit of work that is performed as an atomic unit. In the context of database systems, the database must reflect all the changes made by a transaction, or none of the changes made by the transaction to ensure the integrity of the database. Consequently, none of the changes made by a transaction are permanently applied to a database until the transaction has been fully executed. A transaction is said to "commit" when the changes made by the transaction are made permanent. A transaction is active if the transaction has not been committed, aborted, or otherwise terminated.

A session is at a call boundary if a database instance has finished executing a client call rather being at an intermediate stage of processing the call. For example, to process a call to execute a database statement, a database instance goes through stages, each stage corresponding to a particular type of operation. The stages are (1) creating a cursor, (2) parsing the database statement and binding its variables, (3) executing the database statement, (4) fetching the rows to return for the query, and (5) closing the cursor. These stages are described in greater detail in *Oracle*8 *Server Concepts*, Release 8.0, Volume 3 (the contents of which incorporated herein by reference), at chapter 23. Intermediate stages are the operations performed before processing of the call is complete. In the current example, the intermediate stages are stages (1)-(5). After source instance inst22 performs step (5) in response to a call, source session sess30 is at a call boundary.

A session is at a component boundary if each database component of a session is at its respective component boundary. A database session is at a component boundary for a particular database component if the component session state of the database component can be migrated to another session. A database component provides a function that returns a value indicating whether or not the database component's respective component session state may be migrated. A reason component session state of a database session may not be migrated is that component session state includes a file descriptor of an open file. The file descriptor contains information that is only valid for an instance hosting the database session.

Migrating Stateless Sessions

Unlike statefull database sessions, stateless database sessions may be migrated to another instance without capturing a copy of the session state stored on the source instance and restoring the copy to a destination instance and session. Further, if it is known that the database session is stateless, it may not be necessary to perform such migration checks to ensure session state may be transferred to another instance, checks such as determining whether or not the database session is at the component boundary.

When and how often a database session becomes stateless depends largely on client-side behavior, including behavior of applications and behavior of interface components used by an application to interact with a database server. For example, application server aps20 uses database sessions in such a way that they become stateless multiple, if not numerous times, within the lifetime of a database session. When a database session is checked-out, it is often used only to process one or a few application calls within an application session, and then checked-in. This cycle of being checked-out and checked-in is repeated numerous other times for numerous other application sessions. During one cycle, for example, an application call is made to query a database server. In another cycle, multiple application calls are made to start a transaction, make changes, and then commit the transaction. The application calls made within a cycle are made in such a way that they do not depend on session state generated during previous cycles. In fact, for security reasons, such a dependency may be undesirable. It is possible that a database session on instances inst22 and inst24 can become stateless after each application call and/or after each transaction, i.e. at an application call boundary and/or at each transaction boundary.

The session pooling function can be performed by an interface component, such as client-side interface component 321 or a Java Database component. As shall be described in greater detail, because interface components perform session pooling functions, their behavior affects whether a database session is stateless. Such interface components also have sufficient information to determine whether a database session is stateless. Interface components may thus be used to implement details of migrating stateless sessions without having to implement and/or change application code to handle any of the details of migrating stateless sessions.

According to techniques for migration of stateless sessions described herein, a client of a multi-node server, such as a client on application server aps20 responding to execution of an application or a client-side interface component, supplies statelessness criteria to the server that indicates one or more conditions under which database sessions are stateless and therefore may be migrated. For example, statelessness criteria may specify that a database session is stateless at a transaction boundary, a call boundary, or the combination thereof.

Transparent Session Migration Protocol

Figure 5:
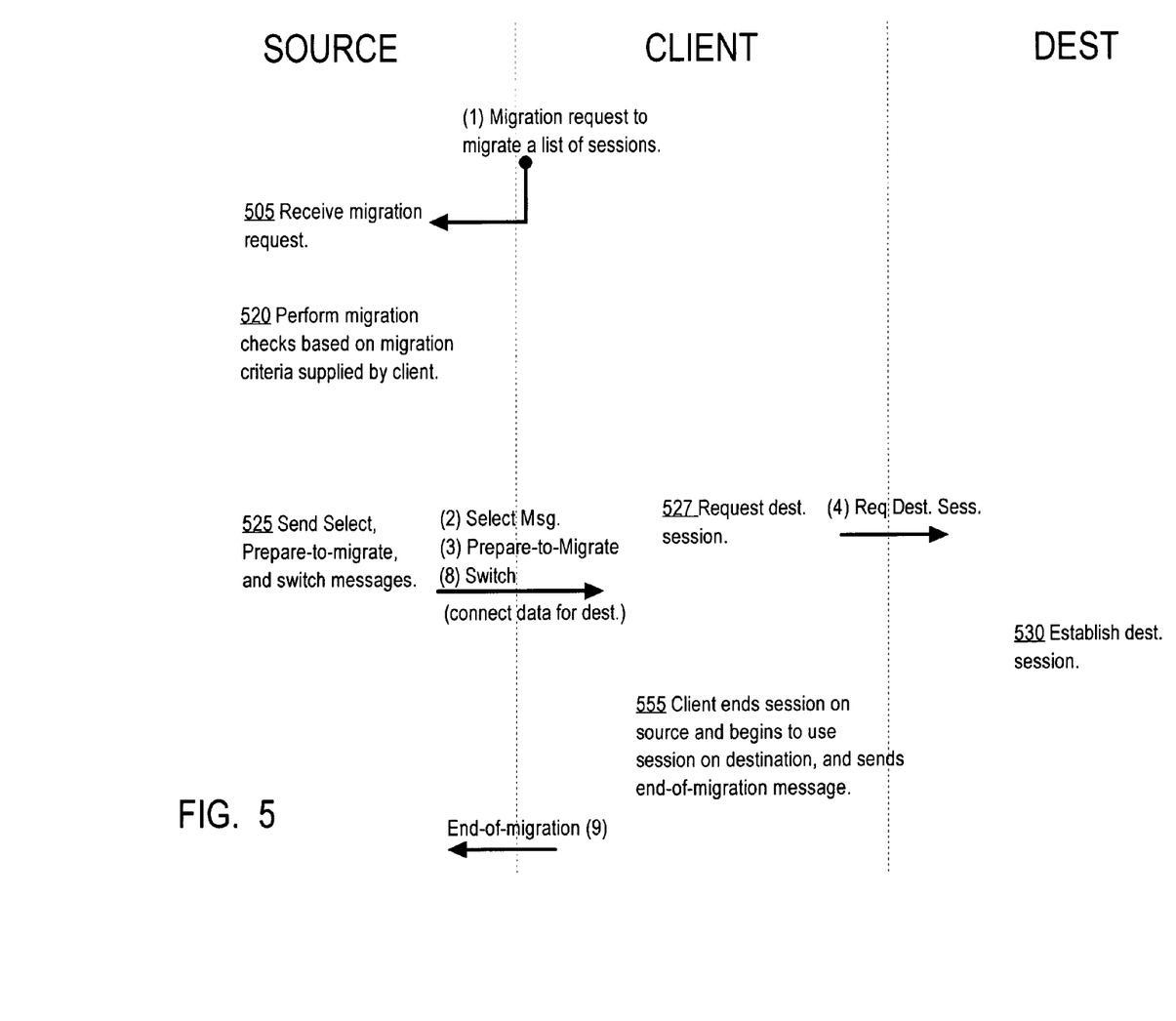
FIG. 5 is an entity-interaction diagram showing a protocol for migrating sessions between servers according to an embodiment of the present invention.

FIG. 5 is an entity-interaction diagram used to illustrate a protocol for session migration of stateless sessions. According to an embodiment, the protocol involves the transmission of the same or similar messages used for migrating statefull sessions as described in Transparent Session Migration Across Servers. These protocols are referred to herein collectively as a statefull protocol. The messages were transmitted separately because each indicates the completion of a particular set of operations, such as completion of the transfer of session state, and are used to verify completion of the set of operations before commencing another phase of session migration. However, such operations are not performed in the stateless session migration protocols described herein; their completion and verification thereof is of course not required. Thus, the transmission of these messages can be bundled.

The protocol is illustrated using application server aps20, source instance inst22, and destination instance inst24 as participants in the protocol. The protocol is initiated by a migration initiator, which is an entity that determines and/or requests that a set of sessions is to be migrated. For example, work load manager wm20 may determine that a set of sessions is to be migrated from source instance inst22 to destination instance inst24 to shift work load from source instance inst22 to destination instance inst24. Work load manager wm20 generates a request to migrate the set of sessions. Work load manager wm20 requesting migration of sessions to shift work load between database instances is just one example of an entity and purpose for requesting session migration; there may be other types of entities that request that a set of sessions be migrated for other types of purposes. For example, an entity responsible for shutting down a database instance may migrate all sessions currently being hosted by the database instance so that the database instance may be shut down.

For purposes of illustration, multi-node database server mds20 has received from application server aps20 statelessness criteria that specify that a database session established for application server aps20 may be migrated if the database session is at the application call boundary.

At step 505, source instance inst22 receives migration request 1, which is a request to migrate a list of one or more sessions. The request is transmitted from a session migration initiator, such as work load manager wm20. A session selected or otherwise designated for session migration is referred to herein as a selected session. For purposes of illustration, the list of sessions to migrate includes only one selected session, source session s_sess31.

At step 520, source instance inst22 performs statelessness checks, that is, determines whether statelessness criteria are satisfied. In the current example, source instance inst22 determines that source session s_sess31 is at an application call boundary.

Once source instance inst22 has determined at step 520 that the statelessness criteria is satisfied, at step 525, source instance inst22 waits for a call from a client for source session s_sess31 and intercepts the call to send the following bundle of messages—select message 2, prepare-to-migrate message 3, and switch message 8. The call is referred to as being intercepted because although the call is being used to effect some action related to session migration, such as sending select message 2, the call was made for some purpose other than to effect such action, such as requesting execution of a query. The output parameters returned to the client include "output data structures" that may have multiple attributes. Source instance inst22 transmits select message 2, prepare-to-migrate message 3, and switch message 8 by setting attributes of the output parameters to particular values.

The select message 2 informs the client-side interface component csi30 that the selected session has been selected for migration. The prepare-to-migrate message 3 instructs client-side interface component csi30 to establish a source session on destination instance inst24 and contains the connect information for establishing a connection to destination instance inst24. The switch message 8 instructs the application server to begin to use the destination session and to terminate the source session.

The intercepted call was initiated within an application call from application server aps20. The remainder of the protocol is performed within this application call.

At step 527, application server aps20 transmits a request to establish a destination session to destination instance inst24. Establishing a session on a database instance may require authenticating application server aps20. To authenticate application server aps20, authenticating information (e.g. user name and password) is supplied to source instance inst22 by client-side interface component csi30. Client-side interface component csi30 had received the authentication information earlier from application server aps20 to establish a session on database cluster dbc20.

Application server aps20 sets session parameters of the destination session to the same values as those of source session s_sess31. The client-side interface component csi30, which had supplied the values to source instance inst22 for source session s_sess31, has retained these values and uses them to set the session parameters of destination instance inst24.

At step 530, destination instance inst24 establishes the destination session.

At step 555, application server aps20 switches to the destination session. The internal state of client-side interface components, such as internal data that maps the external identifier of the source session, is modified to reflect that the destination session is now the client's session. Next, application server aps20 transmits an end-of-migration message to source instance inst22. The end-of-migration message 9 contains data indicating that application server aps20 and/or destination instance inst24 have successfully completed their respective portion of session migration. Finally, application server aps20 sends a message to source instance inst22 to terminate the source session. In subsequent client and application calls by application server aps20, the destination session is used in lieu of the source session.

In the statefull migration protocol, the prepare-to-migrate message 3 and switch message 8 were sent separately to cause and verify that certain operations needed for statefull session migration are performed. These operations are not needed by a stateless session migration. For example, under the statefull migration protocol, the prepare-to-migrate message 3 not only causes the client to establish a session, but causes the destination instance to establish a migration channel. The migration channel is used to transport copies of session state. Information about the migration channel is sent to the client, which, in turn, sends the information to the source instance. The source instance transports the session state via the migration channel. When the transportation of all session state had been completed, then the source instance sends switch message 8.

In a stateless migration protocol, a copy of session state on the source instance is not captured and transferred between the source instance and destination instance. There is thus no need to delay sending switch message 8 until the state has been completely transferred. Therefore, the switch message may be sent along with the prepare-to-migrate message 3.

Steps 520 through 555 are performed within a single application call. Application server aps20 does not know or need to know that the particular database session that is associated with the external session identifier when the application call was commenced is not the same as when the application call returns. No application instructions tailored to handle session migration of a database session had to be executed in order to migrate the session. In this way, the database session has been migrated transparently to the application.

Application Specified Boundaries for Migration

In an embodiment, application server aps20 specifies to database server mds20 when a database session is stateless and when it is not. To specify that a database session is stateless, application server aps20 transmits a message to database server mds20 identifying the stateless database session. Database server mds20 then generates data to mark the database session as stateless.

When database server mds20 receives a request to migrate the database session and determines that it is marked as stateless, database server mds20 migrates the database session. The migration may be performed without performing other statelessness checks. Thus, once database server mds20 determines that a database session is marked as stateless, it may perform step 525, transmitting select message 2, prepare-to-migrate message 3, and switch message 8, as a bundle.

To specify that a database session is not stateless, application server aps20 transmits a message to database server mds20 identifying the database session. Database server mds20 then generates data to unmark the database session as stateless. When database server mds20 receives a request to migrate the database session and determines that it is not marked as stateless, database server mds20 foregoes migrating the database session.

Allowing the application to identify a database session that is stateless enables various optimizations. A database session can be migrated sooner once selected for migration because it is not necessary to wait for the database session to reach a boundary or determine that it is there. Further, some sessions may be migrated that otherwise could not be migrated because their state cannot be transferred due to a variety of reasons or the database server is unable to determine the conditions under which the database session becomes stateless.

For purposes of illustration, once a database session from session pool spl31 is checked-out, multiple application calls may be made to execute multiple transactions. While a database session is checked-out, the database session is statefull. Thus, the database session may be statefull even though it is at an application call boundary or at a transaction boundary. Once the database session is checked-in, however, the database session is no longer statefull.

The database server is able to determine when a database session is at an application boundary and when it is at a transaction boundary. However, knowing when these conditions exist is insufficient to detecting the conditions under which the database session is stateless because a database session may be at a call boundary or transaction boundary and still be statefull.

Application server aps20, on the other hand, is able to determine under what conditions a database session is stateless because it can detect when a database session is checked-in and when it is checked-out. When a database session is checked-out, application server aps20 sends a message to database server mds20 identifying the database session as statefull. When the database session is checked-in, application server aps20 transmits a message to database server mds20 identifying the database session as being stateless.

Hardware Overview

Figure 6:
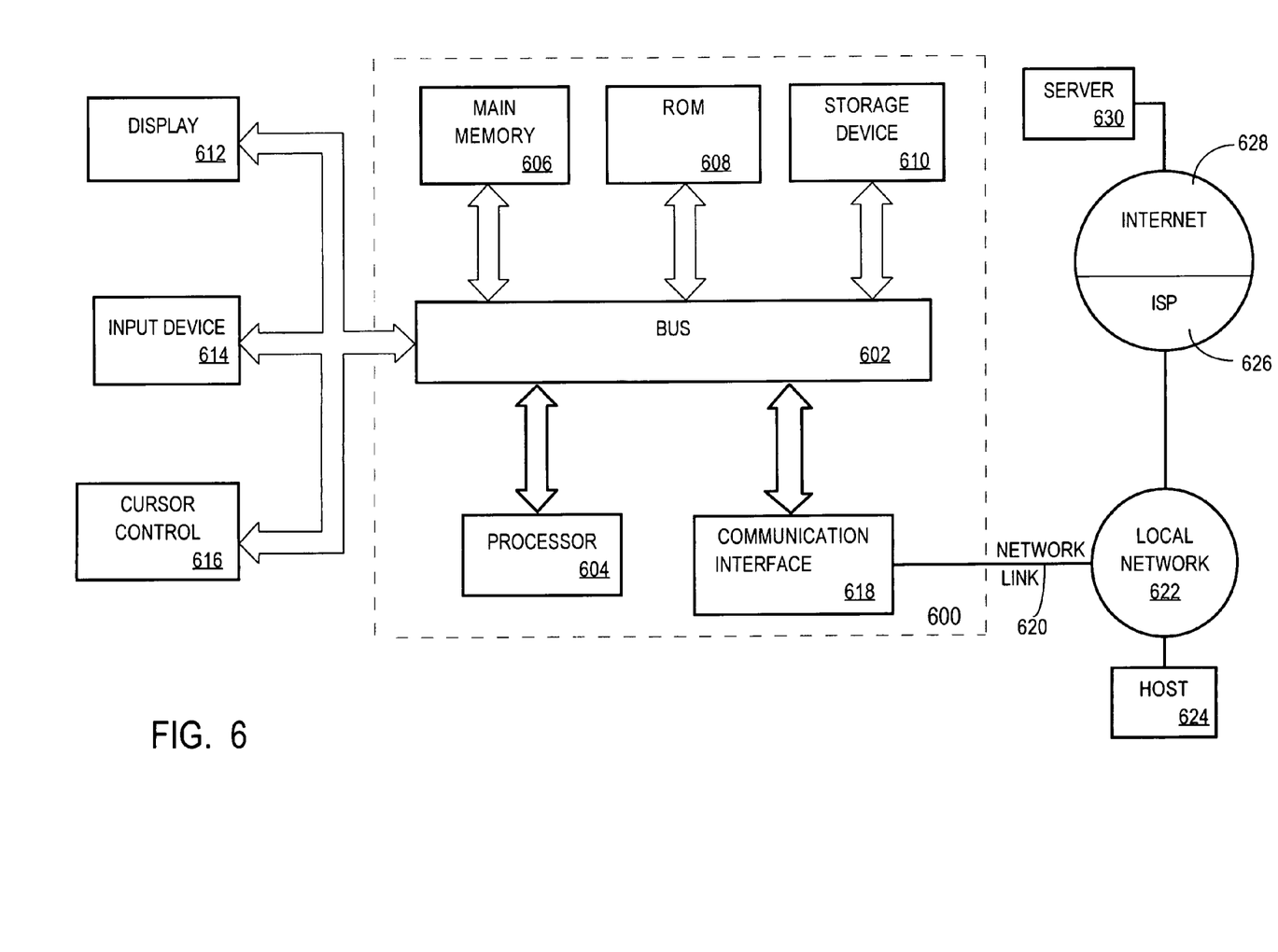
FIG. 6 is a block diagram of a computer system that may be used to implement an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing sessions on a multi-node system, the method comprising:

said multi-node system receiving requests to establish certain sessions for a plurality of clients of said multi-node system, each request of said requests requesting a certain session for a respective client of said multi-node system;

for each request of said requests, said multi-node system establishing a respective first session as the certain session on a first node of said multi-node system;

for each client of a portion of said plurality of clients:

said multi-node system receiving first data that indicates one or more criteria that must be satisfied before transferring said respective first session between said first node and a second node of said multi-node system; and in response to receiving said first data, determining that said respective first session satisfies the one or more criteria indicated by the first data, and generating marking data specifying that said respective first session is a session that can be migrated;

after generating said marking data for more than one first session, selecting to transfer to the second node of said multi-node system at least one first session of said more than one first session specified by said marking data as satisfying said one or more criteria; and said multi-node system establishing a second session on the second node as the certain session for the respective client on said multi-node system.

2. The method of claim 1, wherein said one or more criteria are based on whether said respective first session is stateless.

3. The method of claim 1, wherein said one or more criteria are based on whether a transaction associated with said respective first session has terminated.

4. The method of claim 1, wherein said one or more criteria indicates whether a subsequent application call made after a first application call depends on first session state generated for the first application call.

5. The method of claim 4, wherein said subsequent application call depends on said first session state.

6. The method of claim 1, wherein a server hosts a client of said plurality of clients and a plurality of other sessions;

said server maintains a pool of sessions on said first node, said pool including said respective first session of said client; and said server assigns and unassigns said respective first session to said plurality of other sessions.

7. The method of claim 6, wherein said server is an application server.

8. A method for managing sessions on a multi-node system, the method comprising:

said multi-node system receiving requests to establish certain sessions for a plurality of clients of said multi-node system, each request of said requests requesting a certain session for a respective client of said multi-node system;

for each request of said requests, said multi-node system establishing a respective first session as the certain session on a first node of said multi-node system;

for each client of a portion of said plurality of clients, said multi-node system receiving first data that identifies said respective first session as a session that can be migrated between said first node and a second node without having to capture and transfer state for said respective first session;

in response to receiving said first data, generating marking data specifying that said respective first session is a session that can be migrated between said first node and a second node without having to capture and transfer state for said respective first session;

after generating said marking data for more than one first session, selecting to transfer to the second node of said multi-node system at least one first session of said more than one first session specified by said marking data as satisfying said one or more criteria; and said multi-node system establishing a second session on the second node as the certain session for the respective client on said multi-node system.

9. The method of claim 8, wherein a client of said portion of said plurality of clients transmits said first data in response to determining that a subsequent application call made after a first application call does not depend on first session state generated for the first application call.

10. The method of claim 8, further including:

a server hosting a client of said portion of said plurality of clients and a plurality of other sessions;

said server maintaining a pool of sessions on said first node, said pool including said respective first session of said client;

said server assigning said first session to a particular session of said other sessions; and wherein said server assigning said respective first session causes said server to transmit said first data.

11. A computer-readable volatile or non-volatile medium storing one or more sequences of instructions which, when executed by one or more processors, causes the one or more processors to perform steps comprising:

said multi-node system receiving requests to establish certain sessions for a plurality of clients of said multi-node system, each request of said requests requesting a certain session for a respective client of said multi-node system;

for each request of said requests, said multi-node system establishing a respective first session as the certain session on a first node of said multi-node system;

for each client of a portion of said plurality of clients:

said multi-node system receiving first data that indicates one or more criteria that must be satisfied before transferring said respective first session between said first node and a second node of said multi-node system;

in response to receiving said first data, determining that said respective first session satisfies the one or more criteria indicated by the first data, and generating marking data specifying that said respective first session is a session that can be migrated;

after generating said marking data for more than one first session, selecting to transfer to the second node of said multi-node system at least one first session of said more than one first session specified by said marking data as satisfying said one or more criteria; and said multi-node system establishing a second session on the second node as the certain session for the respective client on said multi-node system.

12. The computer-readable medium of claim 11, wherein said one or more criteria are based on whether said respective first session is stateless.

13. The computer-readable medium of claim 11, wherein said one or more criteria are based on whether a transaction associated with said respective first session has terminated.

14. The computer-readable medium of claim 11, wherein said one or more criteria indicates whether a subsequent application call made after a first application call depends on first session state generated for the first application call.

15. The computer-readable medium of claim 11, wherein the one or more criteria indicates whether a subsequent application call made after a first application call depends on first session state generated for the first application call.

16. The computer-readable medium of claim 15, wherein said subsequent application call depends on said first session state.

17. The computer-readable medium of claim 11, wherein a server hosts a client of said plurality of clients and a plurality of other sessions;

said server maintains a pool of sessions on said first node, said pool including said respective first session of said client; and said server assigns and unassigns said respective first session to said plurality of other sessions.

18. The computer-readable medium of claim 17, wherein said server is an application server.

19. A computer-readable volatile or non-volatile medium storing one or more sequences of instructions which, when executed by one or more processors, causes the one or more processors to perform:

said multi-node system receiving requests to establish certain sessions for a plurality of clients of said multi-node system, each request of said requests requesting a certain session for a respective client of said multi-node system;

for each request of said requests, said multi-node system establishing a respective first session as the certain session on a first node of said multi-node system;

for each client of a portion of said plurality of clients, said multi-node system receiving first data that identifies said respective first session as a session that can be migrated between said first node and a second node without having to capture and transfer state for said respective first session;

in response to receiving said first data, generating marking data specifying that said respective first session is a session that can be migrated between said first node and a second node without having to capture and transfer state for said respective first session;

after generating said marking data for more than one first session, selecting to transfer to the second node of said multi-node system at least one first session of said more than one first session specified by said marking data as satisfying said one or more criteria; and said multi-node system establishing a second session on the second node as the certain session for the respective client on said multi-node system.

20. The computer-readable medium of claim 19, wherein a client of said portion of said plurality of clients transmits said first data in response to determining that a subsequent application call made after a first application call does not depend on first session state generated for the first application call.

21. The computer-readable medium of claim 17, further including instructions which, when executed by one or more processors, cause the one or more processors to perform:

a server hosting a client of said portion of said plurality of clients and a plurality of other sessions;

said server maintaining a pool of sessions on said first node, said pool including said respective first session of said client;

said server assigning said first session to a particular session of said other sessions; and     wherein said server assigning said respective first session causes said server to transmit said first data.

* * * * *